United States Patent
Lewis et al.

[11] Patent Number: 5,987,974
[45] Date of Patent: Nov. 23, 1999

[54] PORTABLE CYLINDER CONTRIBUTION TESTER FOR A VEHICLE WHICH INCLUDES A DIESEL ENGINE WHICH IS CONTROLLED BY AN ELECTRONIC CIRCUIT

[75] Inventors: John Joseph Lewis; Glen Thomas Hart, both of San Jose, Calif.

[73] Assignee: Mission Valley Ford Truck Sales, Inc., San Jose, Calif.

[21] Appl. No.: 09/006,852

[22] Filed: Jan. 14, 1998

[51] Int. Cl.[6] .................................................. G01M 15/00
[52] U.S. Cl. ................................................................ 73/116
[58] Field of Search ..................................... 701/101, 110, 701/111; 73/116, 117.2, 117.3, 118.1

[56] References Cited

U.S. PATENT DOCUMENTS

| | | | |
|---|---|---|---|
| 1,414,734 | 5/1922 | Giovannoni | 324/384 |
| 1,450,896 | 4/1923 | Pache | 324/384 |
| 1,617,617 | 2/1927 | Doody | 324/397 |
| 1,632,166 | 6/1927 | Bourcier | 73/116 |
| 2,477,618 | 8/1949 | Kasper et al. | 324/384 |
| 3,356,935 | 12/1967 | Morgan | 324/383 |
| 3,499,322 | 3/1970 | Pelta et al. | 73/116 |
| 3,583,217 | 6/1971 | Howes | 73/116 |
| 3,788,129 | 1/1974 | Trussell | 324/378 |
| 3,940,977 | 3/1976 | Voross et al. | 73/116 |
| 3,964,301 | 6/1976 | Hanson et al. | 73/116 |
| 4,325,128 | 4/1982 | Abnett et al. | 73/116 |
| 5,119,783 | 6/1992 | Komurasaki | 73/117.3 |
| 5,481,461 | 1/1996 | Miyamoto et al. | 701/101 |
| 5,710,375 | 1/1998 | Roger | 73/117.3 |

*Primary Examiner*—G. Dombroske
*Attorney, Agent, or Firm*—Sawyer & Associates

[57] ABSTRACT

The present invention provides a portable cylinder contribution tester for an electronic diesel engine, the diesel engine including a plurality of cylinders. The tester comprises a plurality of switches, each of the plurality of switches coupled to and for controlling one of the plurality of cylinders and a case for mounting the plurality of switches. When an abnormal diesel engine operation is detected each of the plurality of switches can be activated. When one of the plurality of switches is activated and the diesel engine does not decrease in performance it is indicated that the associated cylinder is malfunctioning. Existing test equipment for most electronic diesel engines is PC based and available to franchised dealers only, as well as not being portable for drive testing. Through the use of a cylinder contribution tester in accordance with the present invention, these type of repairs could be available to many independently owned non-franchised facilities. A cylinder contribution tester in accordance with the present invention is electromechanical, stand alone, self contained, and portable on the vehicle for driver testing.

6 Claims, 2 Drawing Sheets

PORTABLE CYLINDER CONTRIBUTION TESTER FOR A VEHICLE WHICH INCLUDES A DIESEL ENGINE WHICH IS CONTROLLED BY AN ELECTRONIC CIRCUIT

FIELD OF THE INVENTION

The present invention relates generally to diesel engines and more particularly to a system and method for testing the contribution of each cylinder in such an engine.

BACKGROUND OF THE INVENTION

Diesel engines utilized in automobiles and the like include a plurality of cylinders for operation. When one or more of the cylinders are not operating properly, the engine will act abnormally, such as engine roughness, loss of power, lower engine speed, etc. Typically, when these problems occur in a diesel engine, the engine must be tested. These diesel engines are typically controlled by an on-board computer system. Accordingly, known test equipment for diesel engines is personal computer based and available to franchised dealers. Typically, the diagnostic test equipment is sophisticated electronic equipment that interfaces with the electronics of the modem automobile, truck, or the like. Accordingly, this test equipment is very expensive and costly to maintain. Oftentimes the problems associated with poor cylinder operation are intermittent in nature and can only be determined when the vehicle utilizing the diesel engine is in normal operation. That is, for example, during driving of a diesel powered automobile, the engine loses power, but when the automobile is brought to the service station and tested the engine does not lose power. However, known test equipment is typically resident only in a franchised service station.

Accordingly, it would be useful to provide a system which can be utilized during the normal operation of a diesel powered vehicle such as an automobile or the like. The system should be easy to implement, cost effective and adaptable to existing diesel powered vehicles. The system should be useful particularly for automotive vehicles which include on-board computer based control systems. The present invention addresses such a need.

SUMMARY OF THE INVENTION

The present invention provides a portable cylinder contribution tester for an electronic diesel engine, the diesel engine including a plurality of cylinders. The tester comprises a plurality of switches, each of the plurality of switches coupled to and for controlling one of the plurality of cylinders and a case for mounting the plurality of switches. When an abnormal diesel engine operation is detected each of the plurality of switches can be activated. When one of the plurality of switches is activated and the diesel engine does not decrease in performance it is indicated that the associated cylinder is malfunctioning.

Existing test equipment for most electronic diesel engines is PC based and available to franchised dealers only, as well as not being portable for drive testing. Through the use of a cylinder contribution tester in accordance with the present invention, these type of repairs could be available to many independently owned non-franchised facilities. A cylinder contribution tester in accordance with the present invention is electromechanical, stand alone, self contained, and portable on the vehicle for drive testing.

DETAILED DESCRIPTION OF THE INVENTION

The present invention relates to a system and method for testing the contribution of each cylinder in a diesel engine. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

The present invention takes advantage of the fact that many engine problems are mechanical in nature. Therefore, a test system is provided which monitors each cylinder independently without requiring sophisticated electronic circuitry. To more particularly describe the features of the present invention, refer now to the following discussion in conjunction with the accompanying figures.

Typically, an automobile with a diesel engine includes an injector driven module which is controlled by an on-board computer system via a wiring harness. The injector driver module that is typically within a diesel powered vehicle is utilized to advantage in the present invention through the use of a cylinder contribution tester for an electronic diesel engine.

Figure 1:
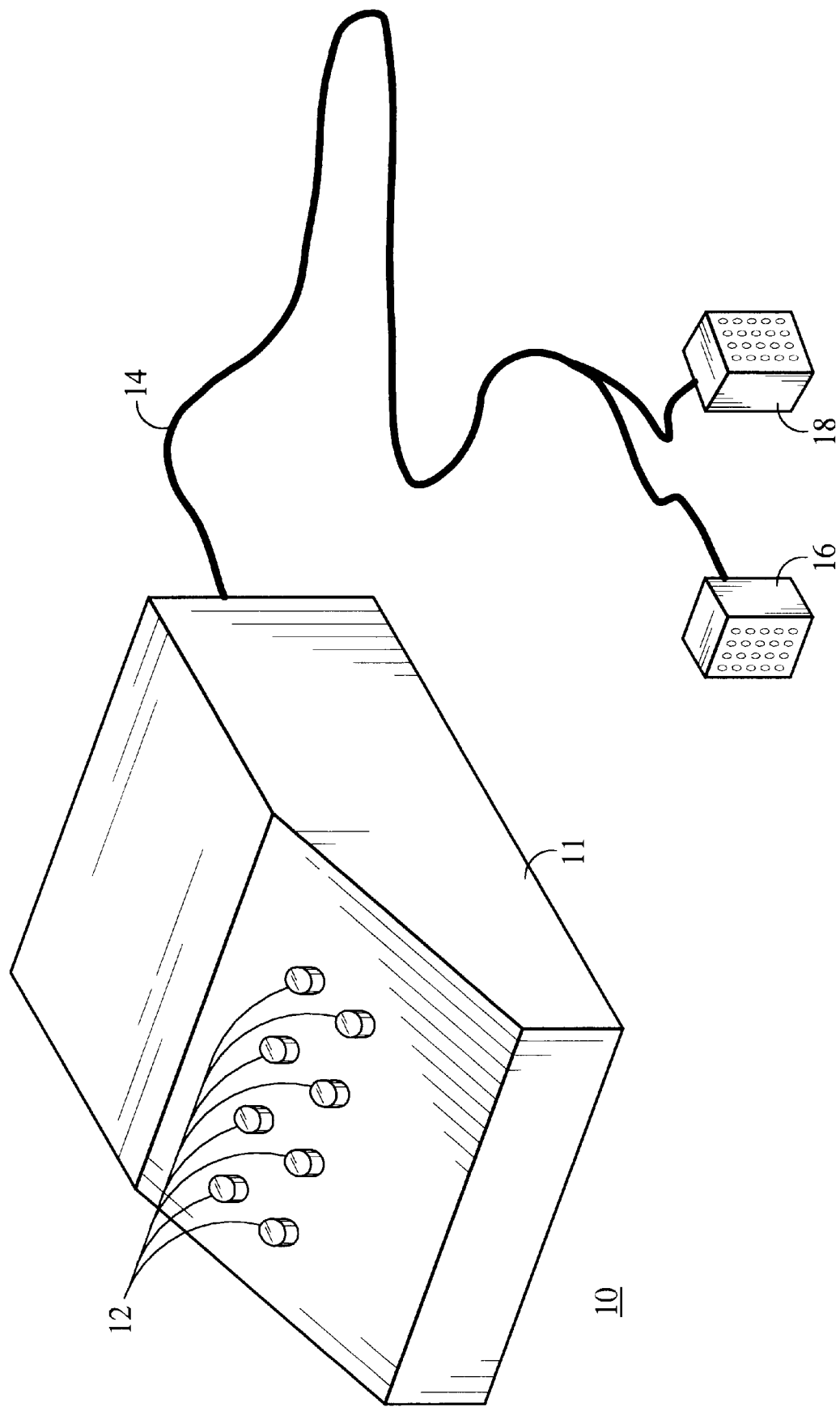
FIG. 1 is a perspective view of a cylinder contribution tester in accordance with the present invention.

FIG. 1 is a perspective view of a portable cylinder contribution tester 10 in accordance with the present invention. The contribution tester 10 comprises control cases 11 which include a plurality of normally closed switches 12. The plurality of switches 12 are marked in relation to the numeric ID of the cylinder within the diesel engine it controls. As is seen, there are eight switches 12 coupled to eight cylinders. However, one of ordinary skill in the art readily recognizes there can be any number of cylinders and switches and their use would be within the spirit and scope of the present invention. A wiring harness 14 is connected from the plurality of switches 12 to a pair of wire harness hard shell connectors 16 and 18.

Figure 2:
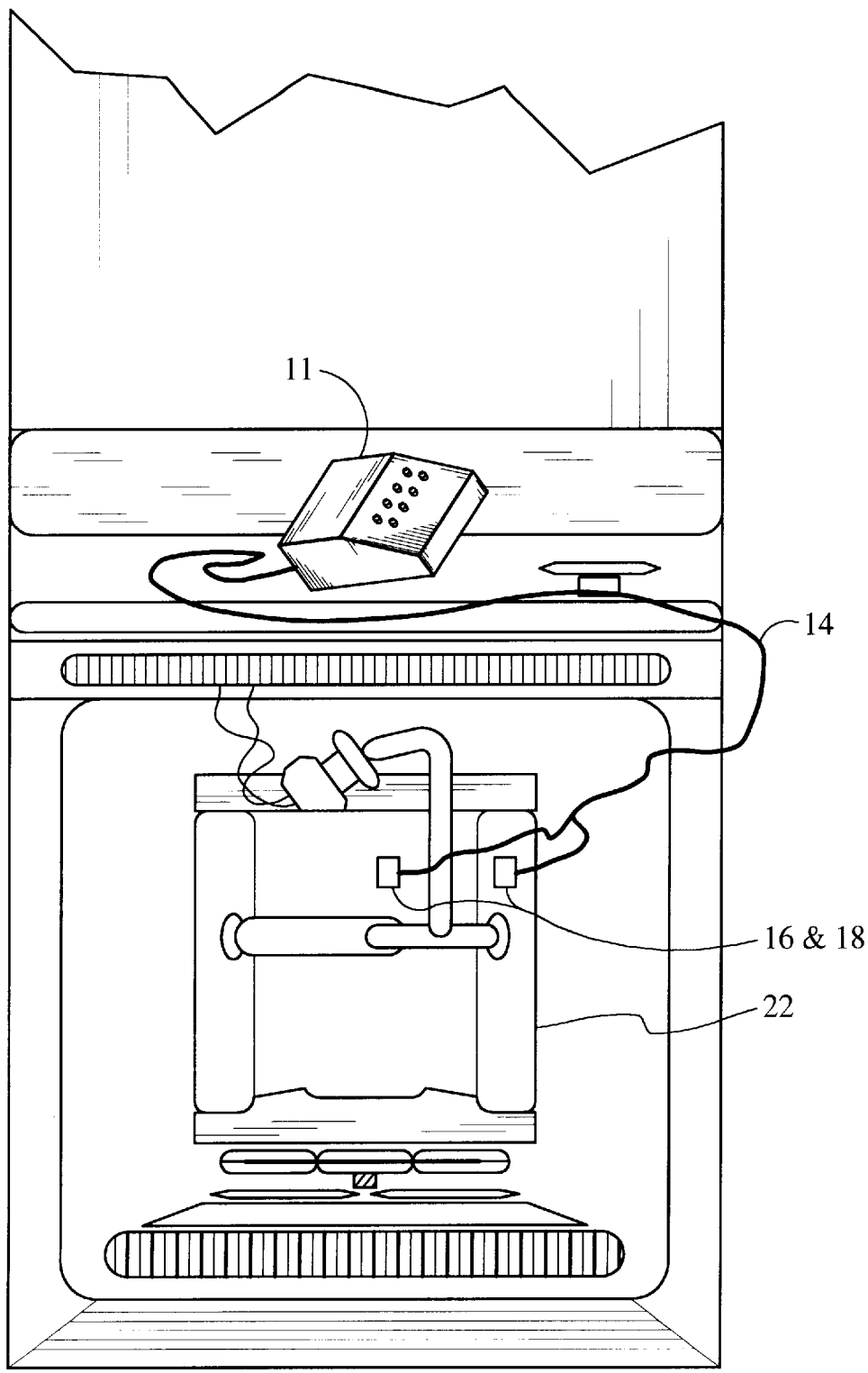
FIG. 2 shows the tester coupled to the injection module of a vehicle.

Referring now to FIG. 2 what is shown is the tester 10 coupled to the injector module (not shown) of a vehicle 24. An interface harness 20 is wired between the hard shell connectors 16 and 18 via a pin connection. In one embodiment, the connectors 16 and 18 are coupled via a 42 pin connector. However, one of ordinary skill in the art readily recognizes the connector pins can be any number and still be within the spirit and scope of the present invention. The existing vehicle wiring from the injector driver module of the vehicle 24 to the engine harness 20 is connected to the harness 14 of the cylinder contribution tester. The harness 14 can be of any type; it must, however, be adaptable to the wiring of the particular vehicle being tested. Each wire of the wiring harness is coupled to one of the switches. The contribution tester 10 is now installed.

Operation

In one embodiment, the vehicle 24 is taken out for a test drive with the contribution tester 10 installed. When an abnormal engine operation is detected by the operator, evidenced by engine roughness, loss of power, lower engine speed, etc., the operator activates each switch 12 on the control case 11 of contribution tester 10 in sequence. If the activation of a switch 12 produces further decrease in performance, the conclusion is that the cylinder associated therewith is active. When a switch 12 is selected whereby no change in performance is evident, the conclusion is that a malfunctioning cylinder associated therewith has been found.

Advantages

Existing test equipment for most electronic diesel engines is PC based and available to franchised dealers only, as well as not being portable for driver testing. Through the use of a cylinder contribution tester in accordance with the present invention, these type of repairs could be available to many independently owned non-franchised facilities. A cylinder contribution tester in accordance with the present invention is electromechanical, stand alone, self contained, and portable on the vehicle for drive testing.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A portable cylinder contribution tester for a diesel engine, the diesel engine including a plurality of cylinders, comprising:

a plurality of switches, each of the plurality of switches coupled directly to and for controlling one of the plurality of cylinders; and a case for mounting the plurality of switches, wherein when an abnormal diesel engine operation is detected, each of the plurality of switches can be activated, wherein when one of the plurality of switches is activated and the diesel engine does not decrease in performance it is indicated that the associated cylinder is malfunctioning.

2. The tester of claim 1 in which the tester of claim 1 in which the plurality of switches are coupled via a wiring harness.

3. The tester of claim 2 wherein each of the switches are marked in relation to numeric identification of associated cylinders.

4. The tester of claim 3 wherein the switches are normally closed.

5. The tester of claim 4 wherein the switches are activated sequentially.

6. The tester of claim 5 wherein the wiring harness being coupled from the switches to wire harness connectors, and the wiring harness includes an interface harness being coupled between the connectors, wherein the wiring from the vehicle being coupled to the connectors.

\* \* \* \* \*